F. L. SMITH & A. A. MITCHELL.
ROUTE MAP AND INDICATOR.
APPLICATION FILED AUG. 18, 1916.
1,205,401.
Patented Nov. 21, 1916.
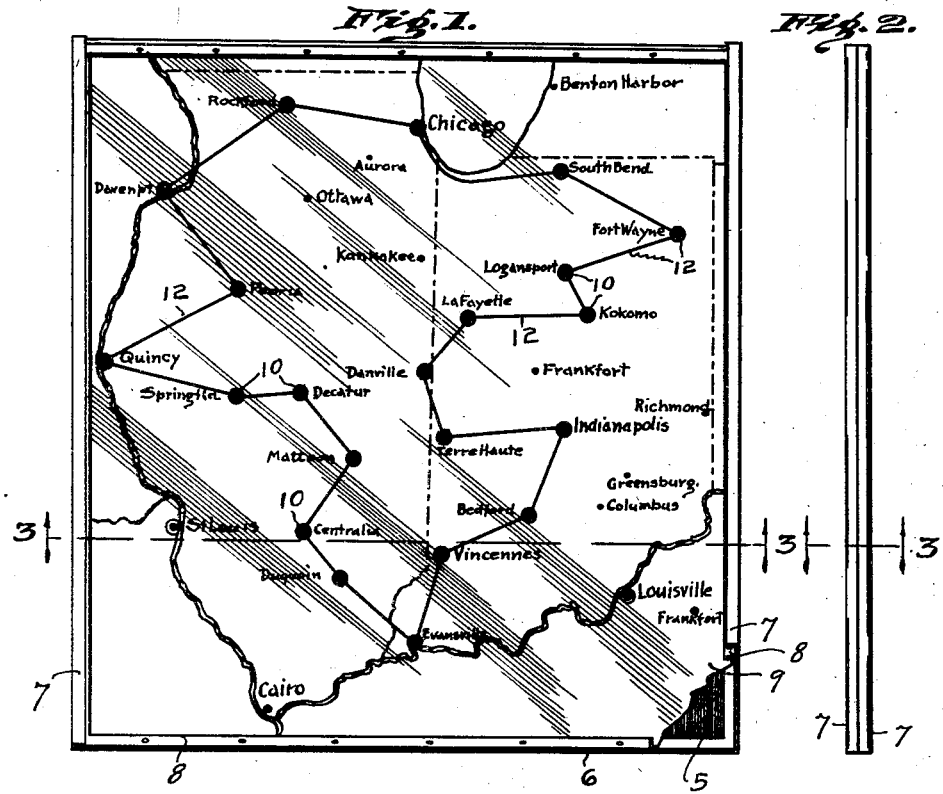
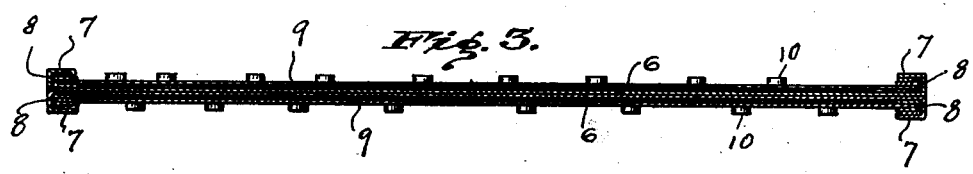
Inventors,
Frederick L. Smith &
Avery A. Mitchell
By Minturn & Woerner,
Attorneys.

UNITED STATES PATENT OFFICE.

FREDERICK L. SMITH AND AVERY A. MITCHELL, OF INDIANAPOLIS, INDIANA.

ROUTE-MAP AND INDICATOR.

1,205,401. Specification of Letters Patent. Patented Nov. 21, 1916.

Application filed August 18, 1916. Serial No. 115,738.

*To all whom it may concern:*

Be it known that we, FREDERICK L. SMITH and AVERY A. MITCHELL, citizens of the United States, residing at Indianapolis, in the county of Marion and State of Indiana, have invented certain new and useful Improvements in Route-Maps and Indicators, of which the following is a specification.

The object of this invention is to provide simple, inexpensive and convenient means for marking towns or other localities on a map, as in the case of a wholesale merchant or a manufacturer who desires to visualize the extent to which a certain territory is being or has been sold over, to locate inquiries, route traveling men, and the like.

Another object is to provide a map indicator system for the above purposes wherein the map itself is not punctured as with tacks and pins heretofore used for this purpose, or marred or injured in any way, and wherein the designations may be easily changed at will, in whole or in part.

We accomplish the above, and other objects which will hereinafter appear by the mechanism illustrated in the accompanying drawing, in which—

Figure 1, is a plan view of our invention in operative form, Fig. 2 is an edge view of same. Fig. 3, is a section on the lines 3—3 of Figs. 1 and 2 and Fig. 4 is a perspective view of one of the indicator disks, unattached.

Like characters of reference indicate like parts throughout the several views of the drawing.

Our invention comprises a map 5 showing the localities to be indicated on it, with others, and a suitable frame or holder to retain the map in a flat open condition, for convenient access and use. This holder may be variously formed of any suitable material, that shown in the drawing being only by way of illustration and not an arbitrary construction. As here shown it comprises a sheet of tin 6, to which the map 5 is pasted or otherwise attached, and the two opposite side edges of the sheet are bent at right angles toward the side having the map, and again inwardly at right angles, to form slideways 7, 7, to receive and retain a removable metal frame 8 which is filled with and holds a sheet of celluloid or other transparent material 9. These parts, assembled as shown in Fig. 1, disclose the drawing and localities of the map clearly through the celluloid cover.

A number of disks 10, of cardboard or other suitable material, suitably colored or marked so as to be distinguishable from each other if desired, are provided, and one of these is attached to the celluloid outer surface immediately over the designation on the printed map, of a city or town to be indicated. The disks may be secured by the aid of paste, mucilage, or the like adhesive soluble in water, which will enable them to be soaked loose and removed when any one or all of the indicating disks are to be changed.

To indicate a route, such as that frequetly taken by traveling salesmen, lines 12 are drawn with crayon, pencil or ink from disk to disk to indicate the sequence of their visitation. The route lines may be drawn before the disks are applied, with our device, which is often desirable in the making up of a route, and which cannot be accomplished with those familiar devices wherein a string is stretched from one pin or tack to another driven to indicate the towns.

The edges 7 of the holder 6 are preferably of greater projection than the pasted disks for the protection of the latter.

In the drawing we have shown a pair of holders secured to each other back to back, which enables both sides of the device to be used.

The leaves as above made up may be bound together in book form, or removably stored as sliding sections or trays in a cabinet, neither of which are shown.

While we have described our invention with more or less minuteness as regards details of construction and arrangement, and as being embodied in certain precise forms, we do not desire to be limited thereto unduly or any more than is pointed out in the claims. On the contrary, we contemplate all proper changes in form construction and arrangement, the omission of immaterial elements and the substitution of equivalents as circumstances may suggest or as necessity may render expedient.

We claim—

1. A holder having a flat surface and a map secured to said surface, in combination with a transparent material covering the map and disks adhesively secured to the outer surface of the transparent material over points of the map to be conspicuously designated.

2. A holder having a flat surface and a map secured to said surface, in combination with a transparent material covering the map and disks adhesively secured to the outer surface of the transparent material over points of the map to be conspicuously designated, said transparent material having lines marked thereon connecting said disks.

3. A holder having a flat surface and a map secured to said surface and said surface having edge-means to removably secure a frame, in combination with a frame removably secured by said means, a transparent material filling said frame, and disks adhesively secured to the outer surface of the transparent material.

In witness whereof we have hereunto set our hands and seals at Indianapolis, Indiana, this 4th day of Aug., A. D. one thousand nine hundred and sixteen.

FREDERICK L. SMITH. [L. S.]
AVERY A. MITCHELL. [L. S.]